United States Patent
Desai et al.

(10) Patent No.: US 11,198,569 B2
(45) Date of Patent: Dec. 14, 2021

(54) AGRICULTURAL EQUIPMENT CARRIER

(71) Applicant: CNH Industrial America LLC, New Holland, PA (US)

(72) Inventors: Pinakin Desai, Naperville, IL (US); Kevin David Monk, Shorewood, IL (US); Stephen Michael Faivre, Sycamore, IL (US); Nathan Taylor, Sycamore, IL (US); David W. Larson, Maple Park, IL (US)

(73) Assignee: CNH Industrial America LLC, New Holland, PA (US)

( * ) Notice: Subject to any disclaimer, the term of this patent is extended or adjusted under 35 U.S.C. 154(b) by 313 days.

(21) Appl. No.: 16/303,785

(22) PCT Filed: May 23, 2017

(86) PCT No.: PCT/US2017/034060
§ 371 (c)(1),
(2) Date: Nov. 21, 2018

(87) PCT Pub. No.: WO2017/205417
PCT Pub. Date: Nov. 30, 2017

(65) Prior Publication Data
US 2020/0317454 A1 Oct. 8, 2020

Related U.S. Application Data
(60) Provisional application No. 62/340,799, filed on May 24, 2016.

(51) Int. Cl.
*B65G 67/42* (2006.01)
*A01D 90/10* (2006.01)
(Continued)

(52) U.S. Cl.
CPC ............ *B65G 67/42* (2013.01); *A01D 90/10* (2013.01); *A01D 90/16* (2013.01); *B60P 1/43* (2013.01);
(Continued)

(58) Field of Classification Search
CPC ........ B65G 67/42; B65G 69/30; B65G 67/34; B65G 67/48; B65G 67/52; B65G 67/30; A01D 90/10; B60P 3/08; B60P 3/42
See application file for complete search history.

(56) References Cited

U.S. PATENT DOCUMENTS 3,606,050 A 9/1971 Silver
3,887,091 A 6/1975 Buck
(Continued)

FOREIGN PATENT DOCUMENTS

CA 2713815 2/2012
DE 2406950 8/1975
(Continued)

OTHER PUBLICATIONS

PCT Application No. PCT/US2017/034060, International Search Report and Written Opinion, dated Aug. 21, 2017, 13 pgs.

*Primary Examiner* — Kaitlin S Joerger
(74) *Attorney, Agent, or Firm* — Patrick Sheldrake; Peter Zacharias

(57) ABSTRACT

An agricultural system includes a carrier configured to transport an agricultural cart to a position proximate to or within an agricultural field. The carrier includes a rotatable base and is configured to receive the agricultural cart on the rotatable base in a docking position. The carrier is configured to move the agricultural cart from the docking position to an unloading position to unload agricultural product from within the agricultural cart to a storage bin via rotation of the rotatable base.

19 Claims, 5 Drawing Sheets

(51) Int. Cl.
  *A01D 90/16* (2006.01)
  *B60P 1/43* (2006.01)
  *B60P 3/08* (2006.01)
  *B60P 3/42* (2006.01)
  *G05D 1/02* (2020.01)

(52) U.S. Cl.
  CPC ............... *B60P 3/08* (2013.01); *B60P 3/42* (2013.01); *G05D 1/0225* (2013.01); *G05D 2201/0201* (2013.01)

(56) References Cited

U.S. PATENT DOCUMENTS

| | | | | |
|---|---|---|---|---|
| 4,430,038 | A * | 2/1984 | Rempel | B60P 1/165 298/11 |
| 5,297,914 | A | 3/1994 | Ash | |
| 5,458,451 | A | 10/1995 | Bratlie et al. | |
| 5,509,723 | A * | 4/1996 | Bratlie | B65G 67/30 298/17 SG |
| 6,199,955 | B1 * | 3/2001 | Rogers | B60P 1/165 298/18 |
| 6,238,162 | B1 | 5/2001 | Mayer et al. | |
| 6,497,541 | B2 | 12/2002 | Pawluk | |
| 6,835,041 | B1 * | 12/2004 | Albert | B61D 9/02 105/241.2 |
| 7,111,907 | B2 * | 9/2006 | Boon | B60P 1/165 298/18 |
| 7,114,909 | B2 * | 10/2006 | McCrory | B65G 67/42 414/809 |
| 7,140,820 | B2 * | 11/2006 | Chang | B60P 3/08 410/24.1 |
| 7,275,901 | B2 | 10/2007 | Carroll | |
| 7,360,843 | B1 * | 4/2008 | Rogers | B60P 1/165 298/18 |
| 7,478,883 | B1 * | 1/2009 | Rogers | B60P 1/165 298/18 |
| 8,684,161 | B2 | 4/2014 | Gausman et al. | |
| 9,180,845 | B2 * | 11/2015 | Fazzalari | B60P 3/08 |
| 9,550,445 | B2 * | 1/2017 | Holmgren | B60P 1/04 |
| 9,567,170 | B2 * | 2/2017 | Bolsoy | B61D 9/08 |
| 10,683,178 | B2 * | 6/2020 | Lanoue | B65G 65/42 |
| 2008/0302309 | A1 * | 12/2008 | Herman | A01K 45/005 119/453 |
| 2012/0051875 | A1 * | 3/2012 | Teichrob | B65G 67/42 414/359 |
| 2020/0262325 | A1 * | 8/2020 | Karg | B60P 1/16 |

FOREIGN PATENT DOCUMENTS

DE 2415725 10/1975
SU 874539 10/1981

* cited by examiner

AGRICULTURAL EQUIPMENT CARRIER

CROSS REFERENCE TO RELATED APPLICATION

This application is a national stage of PCT Application No. PCT/US2017/034060, entitled "AGRICULTURAL EQUIPMENT CARRIER", filed May 23, 2017, which claims priority from and the benefit of U.S. Application Ser. No. 62/340,799, entitled "AGRICULTURAL EQUIPMENT CARRIER", filed May 24, 2016. Each of the foregoing applications is hereby incorporated by reference in its entirety.

BACKGROUND

The subject matter of the disclosure relates generally to agricultural equipment, and more specifically, to a carrier for agricultural equipment.

Agricultural vehicles may move through a field to perform various agricultural operations. For example, a combine may harvest crops, such as wheat, corn, and oats, among others. In the harvesting process, the combine may collect the crops, separate grains/seeds from the crops, and convey the gains/seeds to a storage system (e.g., grain cart). The storage system receives the grains/seeds and transports the grains/seeds to a storage (e.g., a storage bin towed by an on-road truck).

To perform the harvesting process, traditional systems use multiple operators to control the combine and to control the storage system. Further, when the storage system is full, one of the operators transports the grains/seeds to the storage bin. However, while the operator is transporting the grains/seeds to the storage bin, the combine may not have a storage system in which to output the grains/seeds (e.g., while waiting for the storage system to return, while waiting for another system to arrive, etc.). As such, efficiency of the harvesting process may be reduced due to delays in transporting the grains/seeds from the combine to the storage bin.

BRIEF DESCRIPTION

A summary of certain embodiments disclosed herein is set forth below. It should be understood that these aspects are presented merely to provide the reader with a brief summary of these embodiments and that these aspects are not intended to limit the scope of this disclosure. Indeed, this disclosure may encompass a variety of aspects that may not be set forth below.

In a first embodiment, an agricultural system includes a carrier configured to transport an agricultural cart to a position proximate to or within an agricultural field, wherein the carrier comprises a rotatable base and is configured to receive the agricultural cart on the rotatable base in a docking position, and to move the agricultural cart from the docking position to an unloading position to unload agricultural product from within the agricultural cart to a storage bin via rotation of the rotatable base.

In a second embodiment, an agricultural system includes a carrier configured to transport an agricultural cart to an agricultural field or proximate to the agricultural field, wherein the carrier comprises a lower level, an upper level, a first longitudinal side, and a second longitudinal side, opposite the first longitudinal side, a first ramp is positioned on the first longitudinal side and configured to enable the agricultural cart to move from the agricultural field to the upper level, and a second ramp, different from the first ramp, is positioned on the second longitudinal side and configured to enable the agricultural cart to move from the upper level to the agricultural field.

In a third embodiment, an agricultural system includes a carrier configured to transport an agricultural cart to a position proximate to or within an agricultural field, and a carrier controller includes a processor and a memory and configured to control operations of the carrier, wherein the carrier controller is configured to receive at least one of a first signal indicative of a position of the agricultural cart and a second signal indicative of the agricultural cart in a docking position on the carrier, and send a third signal indicative of instructions to unload agricultural product from the agricultural cart into a storage bin while the position of the agricultural cart is within a threshold range of the docking position, the agricultural cart is in the docking position, or a combination thereof.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
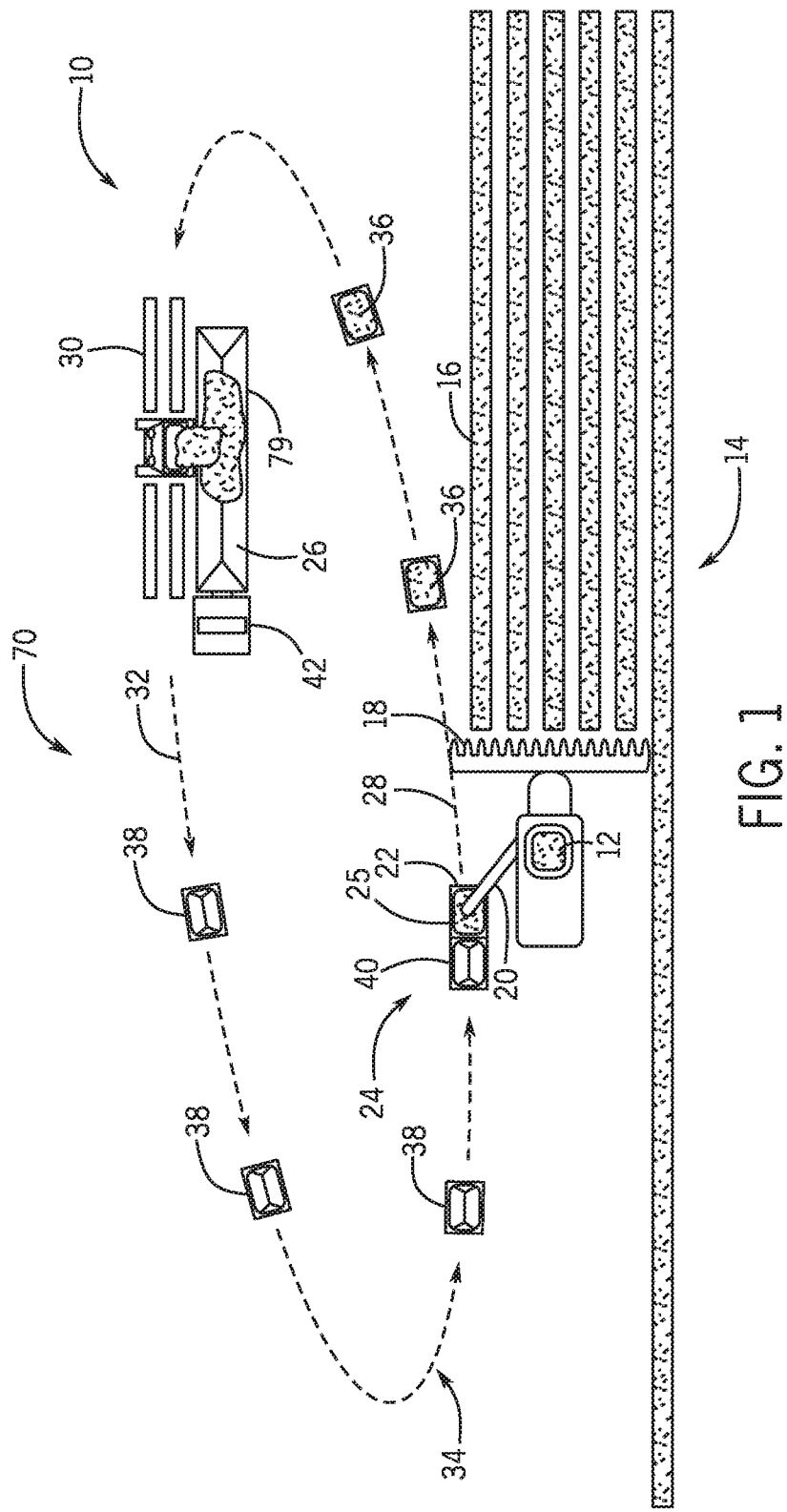
FIG. 1 is a top view of an embodiment of an agricultural system that includes an agricultural cart to transport an agricultural product from an agricultural vehicle to a storage bin.

Turning to the figures, FIG. 1 is a top view of an embodiment of an agricultural system 10 that includes an agricultural vehicle 12, such as a combine, in an agricultural field 14. The agricultural vehicle 12 may be used to harvest any number of crops, such as wheat, corn, oats, sunflowers, and canola, among others. The agricultural vehicle 12 collects crops 16 via a header 18 and performs one or more processes on the crops 16 to generate a harvested agricultural product, such as grain, seed, or other agricultural product. For example, the agricultural vehicle 12 may collect the crop and separate seeds from the crop. An unloader 20 of the agricultural vehicle 12 may convey the harvested agricultural product 22 to an agricultural cart 24, such as a grain cart.

In the illustrated embodiment, the agricultural cart 24 is self-powered (e.g., not towed by a separate vehicle, such as a tractor) and configured to operate at least partially autonomously. Accordingly, an automatic system may direct the agricultural cart 24 without direct control from an operator. For example, an operator may input instructions via a user interface (e.g., of a base station remote from the agricultural cart) and a control system of the agricultural cart 24 may control the cart based on the instructions. In certain embodiments, the instructions may include instructions to initiate operations, instructions to terminate operations, instructions to dock with a selected agricultural vehicle, or a combination thereof, among other instructions.

The agricultural cart 24 may receive the agricultural product 22 from the agricultural vehicle 12 and transport the agricultural product 22 to a storage bin 26, such as a storage tank of a semi-trailer, a cargo container of a train, or the like. In the illustrated embodiment, the agricultural cart 24 transports the agricultural product 22 along a path 28 toward an agricultural carrier system 30. The agricultural carrier system 30 is configured to unload the agricultural product 22 from the agricultural cart 24 into the storage bin 26. Once unloaded, the agricultural cart 24 travels along a return path 32 to the agricultural vehicle 12. Multiple agricultural carts may be used to form a continuous conveyer system 34 of one or more loaded carts 36 traveling along the path 28 toward the agricultural carrier system 30, one or more unloaded carts 38 traveling along the return path 32, one or more agricultural carts 40 in a queue to receive the agricultural product 22, a loading agricultural cart 25 receiving the agricultural product 22 from the agricultural vehicle 12, or a combination thereof. The continuous conveyer system 34 may improve efficiency of the agricultural operation because the loading agricultural cart 25 is receiving grain while other agricultural carts are travelling to receive or unload the agricultural product, thereby increasing an amount of time that the agricultural vehicle 12 is performing agricultural bin operations (e.g., harvesting). Once the storage bin 26 is filled to a selected level with agricultural product, a prime mover 42, such as a tractor unit/truck, may transport the agricultural product 22 to an agricultural facility for storage and/or processing.

Figure 2:
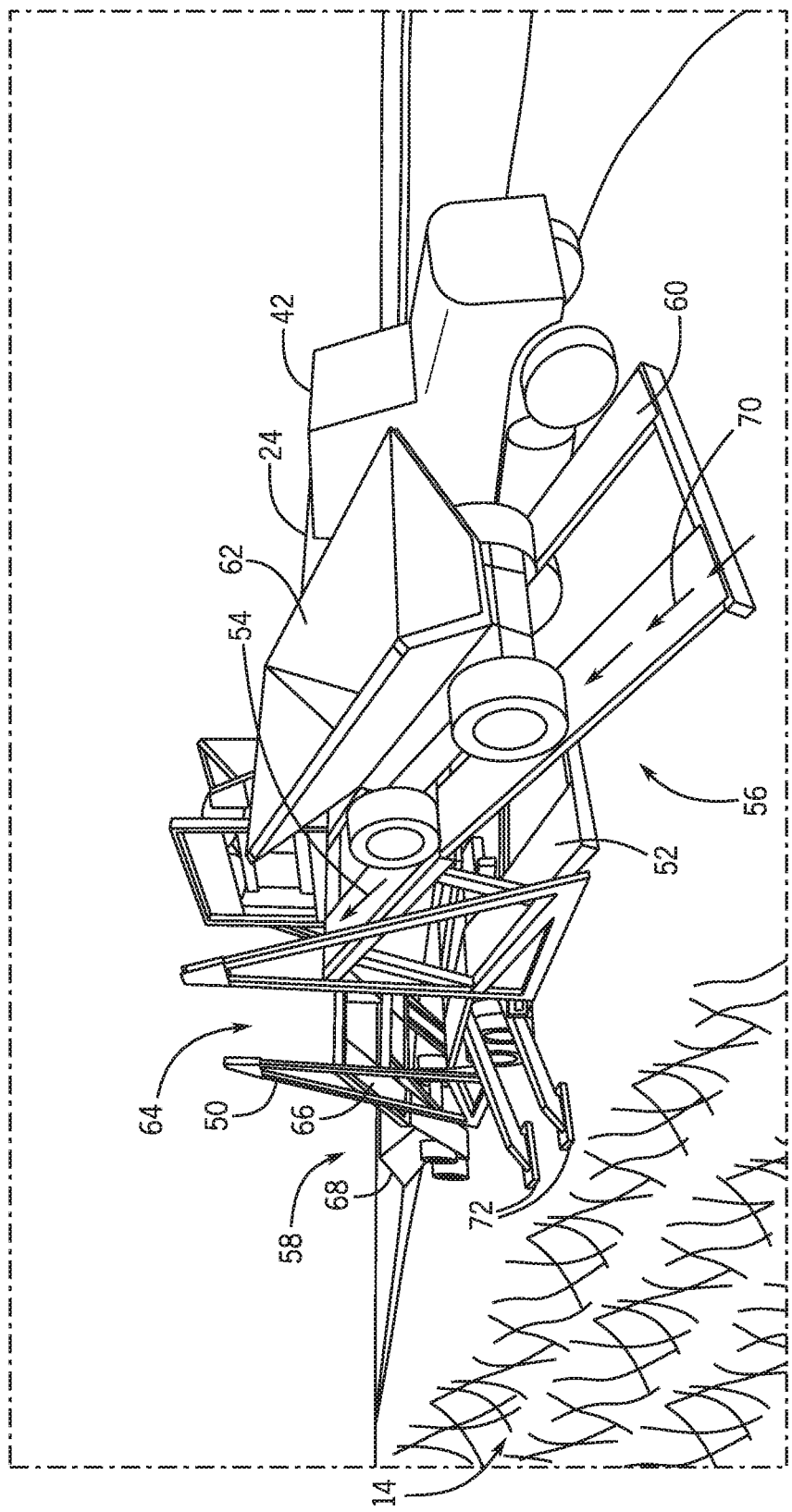
FIG. 2 is a perspective view of an embodiment of an agricultural cart that may be used in the agricultural system of FIG. 1, in which the agricultural cart is transporting the agricultural product.

FIG. 2 is a perspective view of an embodiment of an agricultural cart 24 and an agricultural cart carrier system 30 that may be used in the agricultural system of FIG. 1. As illustrated, the agricultural carrier system 30 is in a harvesting mode and configured to unload agricultural product 22 from the agricultural cart 24 into the storage bin. In the illustrated embodiment, the agricultural carrier system 30 includes a carrier 50 having a lower level 52 configured to store a first set of agricultural carts and an upper level 54 configured to store a second set of agricultural carts while the agricultural carrier system 30 is in a transport mode (e.g., while the carrier 50 transports the agricultural carts to/from the agricultural field). The carrier 50 includes a first longitudinal side 56 and a second longitudinal side 58. The first side 56 includes a first ramp 60, which is in a lowered position to enable an agricultural cart 62 to transport agricultural product from the agricultural field 14 to a docking position 64 on the upper level 54 of the carrier 50. As described in detail below, after the agricultural cart reaches the docking position, the carrier 50 may rotate the agricultural cart to an unloading position to unload the agricultural product from within the agricultural cart to the storage bin. Upon unloading the agricultural product, the carrier 50 may rotate the agricultural cart from the unloading position to the docking position to return the agricultural cart to a position in which the cart may move under its own power. The second side 58 of the carrier 50 includes a second ramp 66, which is in a lowered position to enable an agricultural cart 68 to return to the agricultural field 14 after unloading the agricultural product into the storage bin 26. By including the first ramp 60 and the second ramp 66, the carrier 50 enables the agricultural carts 24 to follow a path 70 between the unloading path 28 and the return path 32. The continuous path enables 24 an agricultural cart to move to the docking position 64 while another agricultural cart 24 returns to the field after unloading, thereby reducing unloading time, as compared to an unloading system that includes a single ramp in which each cart waits for another cart to unload.

In the illustrated embodiment, the carrier 50 includes two support legs 72 configured to stabilize the carrier 50 while the carrier is in the harvesting mode (e.g., in a position to unload agricultural product from carts to the storage bin). While the carrier 50 includes two support legs, it should be appreciated that in alternative embodiments, the carrier 50 may include one, two, three, four, or more support legs.

Figure 3:
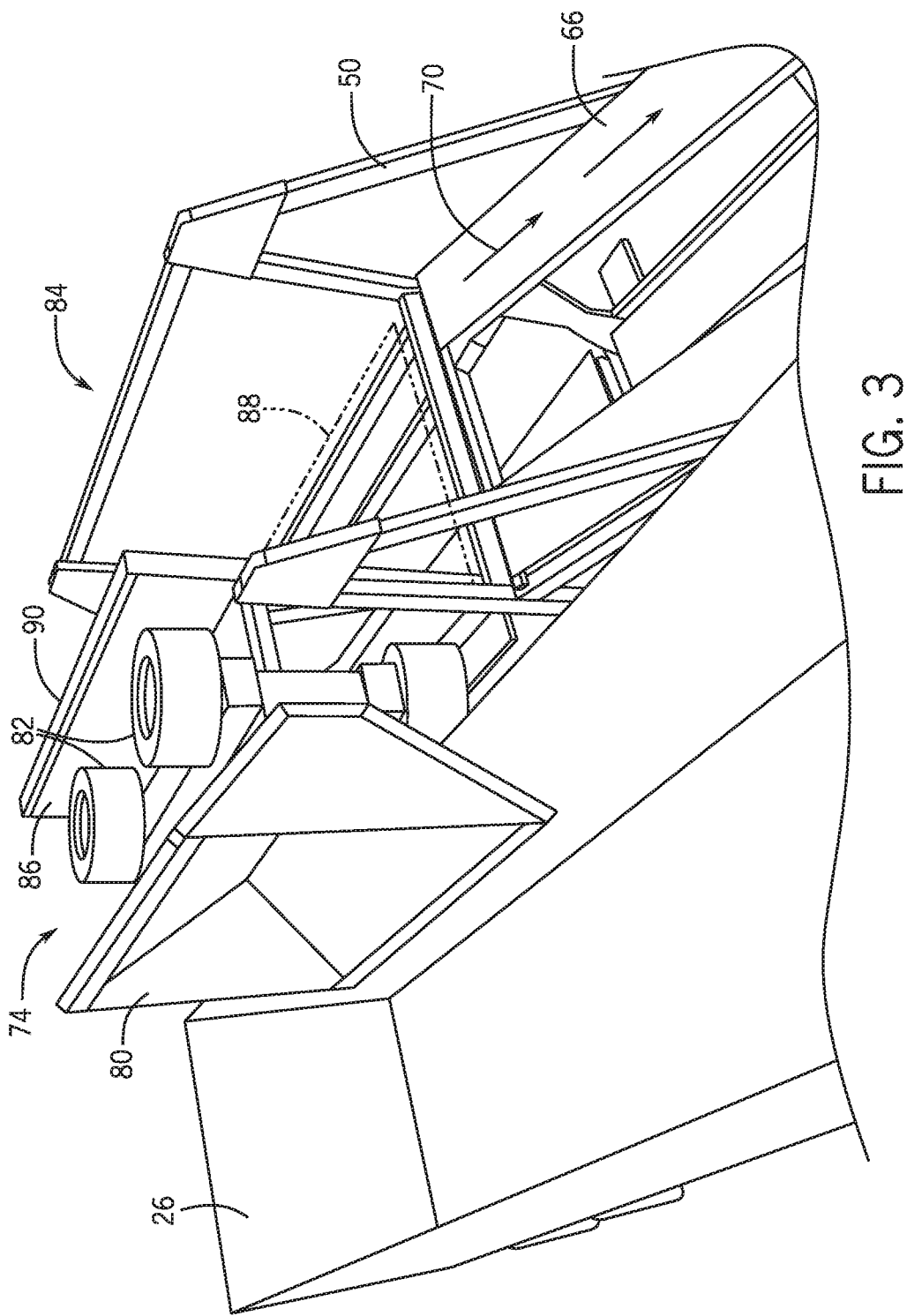
FIG. 3 is a perspective view of an embodiment of the agricultural cart of FIG. 2 unloading the agricultural product into a storage system.

FIG. 3 is a perspective view of the agricultural cart 24 and the agricultural carrier system 30 of FIG. 2. As illustrated, the agricultural carrier system 30 is in the harvesting mode and the agricultural cart is in the unloading position, thereby unloading agricultural product 22 from an agricultural cart 24 into the storage bin 26. In the illustrated embodiment, the agricultural cart 24 includes a storage container 80 to store the agricultural product and wheels 82 (e.g., one, two, three, four, five, or more wheels) to transport the storage container 80 between the storage bin 26 and the agricultural vehicle 12. Further, the agricultural cart 24 may include a motor to drive the wheels 82 to rotate, thereby causing the agricultural cart 24 to move.

In the illustrated embodiment, the agricultural carrier 50 includes an unloading system 84. The unloading system 84 includes a rotatable base 86 configured to support one or more wheels of the agricultural cart 24. The carrier 50 is configured to position the rotatable base 86 in a docking position 88 to enable the agricultural cart 24 to be positioned on the rotatable base 86. While the cart 24 is positioned on the rotatable base 86, the unloading system may rotate the rotatable base 86 from the docking position 88 to an unloading position 90 (e.g., orthogonal to the docking position 88), to unload the agricultural product from the storage container 80 into the storage bin 26. While a docking position and an unloading position is shown in FIG. 3, multiple docking positions and/or unloading positions may be used to unload the agricultural product into the storage bin 26. Upon unloading the agricultural product, the unloading system 84 may rotate the rotatable base 86 from the unloading position 90 to the docking position 88 to enable the agricultural cart 24 to move down the second ramp 66 along the path 70 to return to the agricultural field and to subsequently return to the combine 12 to receive additional agricultural product. Further, the unloading system 84 may include a device (e.g., hydraulic cylinders, pneumatics, etc.) to rotate the rotatable base 86. The unloading system may secure the agricultural cart to the rotatable base using any suitable method. For example, the agricultural cart 24 may include one or more protrusions in configured to engage corresponding recess(es) of the carrier to secure the agricultural cart during the unloading process. While a rotatable base is described in detail with respect to FIG. 3, other embodiments may include any suitable method for unloading the agricultural product from the cart into the storage system. For example, in certain embodiments, the carrier may include a pneumatic control system that instructs a pneumatic tube to unload the agricultural product from the agricultural cart into the storage bin. In other embodiments, the agricultural cart may include an unloading auger configured to rotate from a transportation position in which the agricultural cart may move between the carrier 50 and the agricultural vehicle to an unloading position in which the auger unloads the agricultural product within the agricultural cart into the storage bin.

Figure 4:
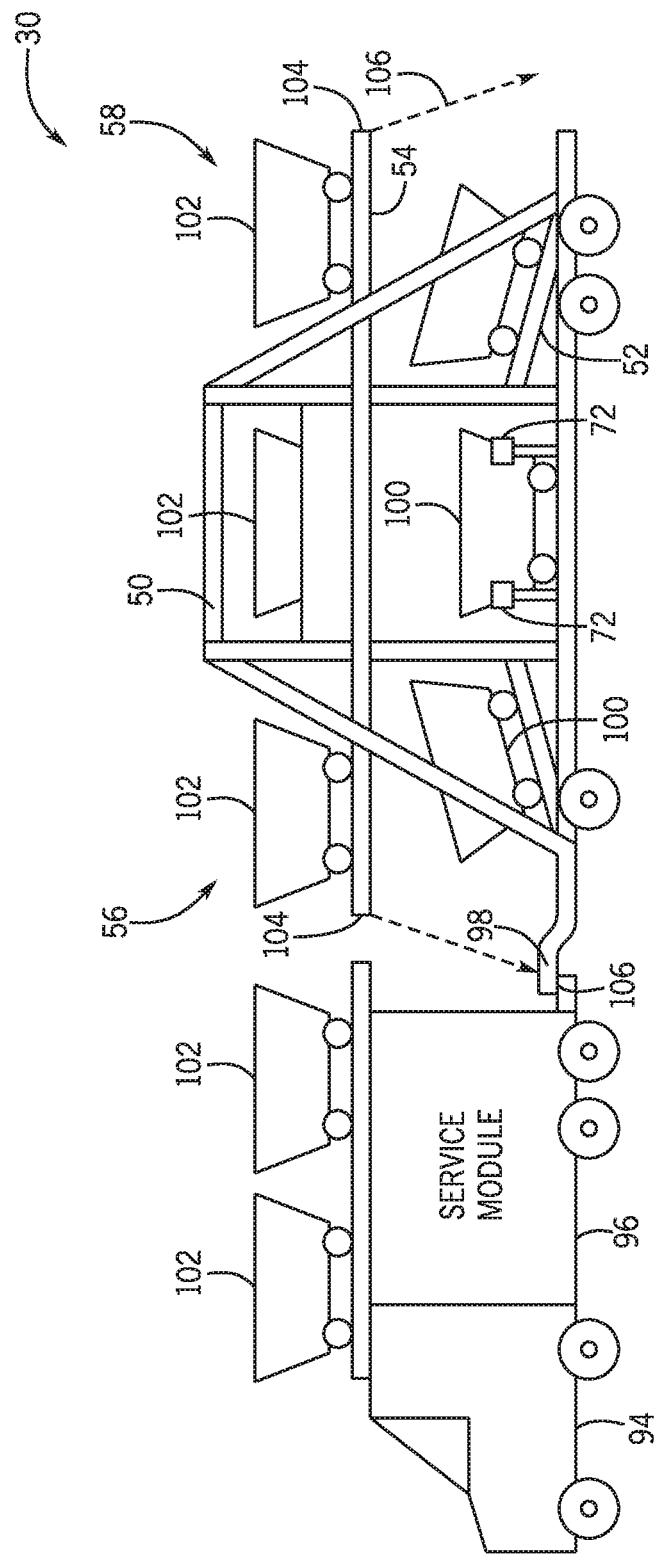
FIG. 4 is a side view of an embodiment of an agricultural carrier system configured to transport multiple agricultural carts.

FIG. 4 is a side view of an embodiment of the agricultural carrier system 30, which is configured to transport multiple agricultural carts. The agricultural carrier system 30 includes a towing vehicle 94, such as a tractor unit, truck, or another prime mover. The towing vehicle 94 includes a service module 96 coupled to the carrier 50 via a hitch 98 (e.g., three point hitch) of the carrier 50 (e.g., in a transportation mode). The service module 96 is configured to transport equipment to the agricultural field. For example, the service module 96 may be driven to the agricultural field via the towing vehicle 94. In some embodiments, the service module 96 may receive signals from the base station indicative of locations in which to transport the equipment. While the illustrated embodiment is configured to be towed by the towing vehicle, in other embodiments, the carrier 50 may be self-propelled (e.g., via an engine on the carrier).

By locating the service module between the towing vehicle 94 and the carrier 50, a number of articulating points may be reduced thereby enabling easier reversing of the agricultural carrier system 30. For example, the towing vehicle may articulate at the hitch 98. Further, by locating the service module 96 near the towing vehicle 94, the service module 96 may receive compressed air, pressurized hydraulic fluid, electrical power, or the like, from the towing vehicle 94 and/or an engine of the towing vehicle 94 could drive an air compressor, hydraulic pump, generator, or the like, via a power take off (PTO) shaft. Additionally, to disconnect the carrier 50 and utilize the carrier 50 in a harvesting mode, as described above, the carrier 50 may be disconnected without disconnecting the service module 96 from the towing vehicle 94. While the agricultural carrier system 30 includes a carrier coupled to a service module, in other embodiments, the towing vehicle may be coupled to the carrier without the service module, or the service module may be towed behind the carrier.

The carrier 50 includes a lower level 52 configured to store a first set 100 of agricultural carts 24 and an upper level 54 configured to store a second set 102 of agricultural carts 24. The carrier 50 is configured to transform from the transportation mode in which the carrier 50 transports the agricultural carts 24 to the agricultural field into the harvesting mode in which the carrier facilitates unloading of the agricultural product 24 from the agricultural carts 24 into the storage bin. To transform the carrier 50 into the harvesting mode, a first ramp and second ramp of the upper level 54 may be lowered from a raised position 104 to a lowered position 106 (e.g., via hydraulic cylinders, etc.). For example, to unload the agricultural carts while in the transportation mode, the first set 100 of agricultural carts 24 may move onto the agricultural field. Then, the ramp on the second side 58 may be lowered to the lowered position 106 to enable the second set of agricultural carts 24 to move onto the agricultural field. Further, the support legs 72 may be deployed (e.g., lowered via hydraulic cylinders, etc.).

Figure 5:
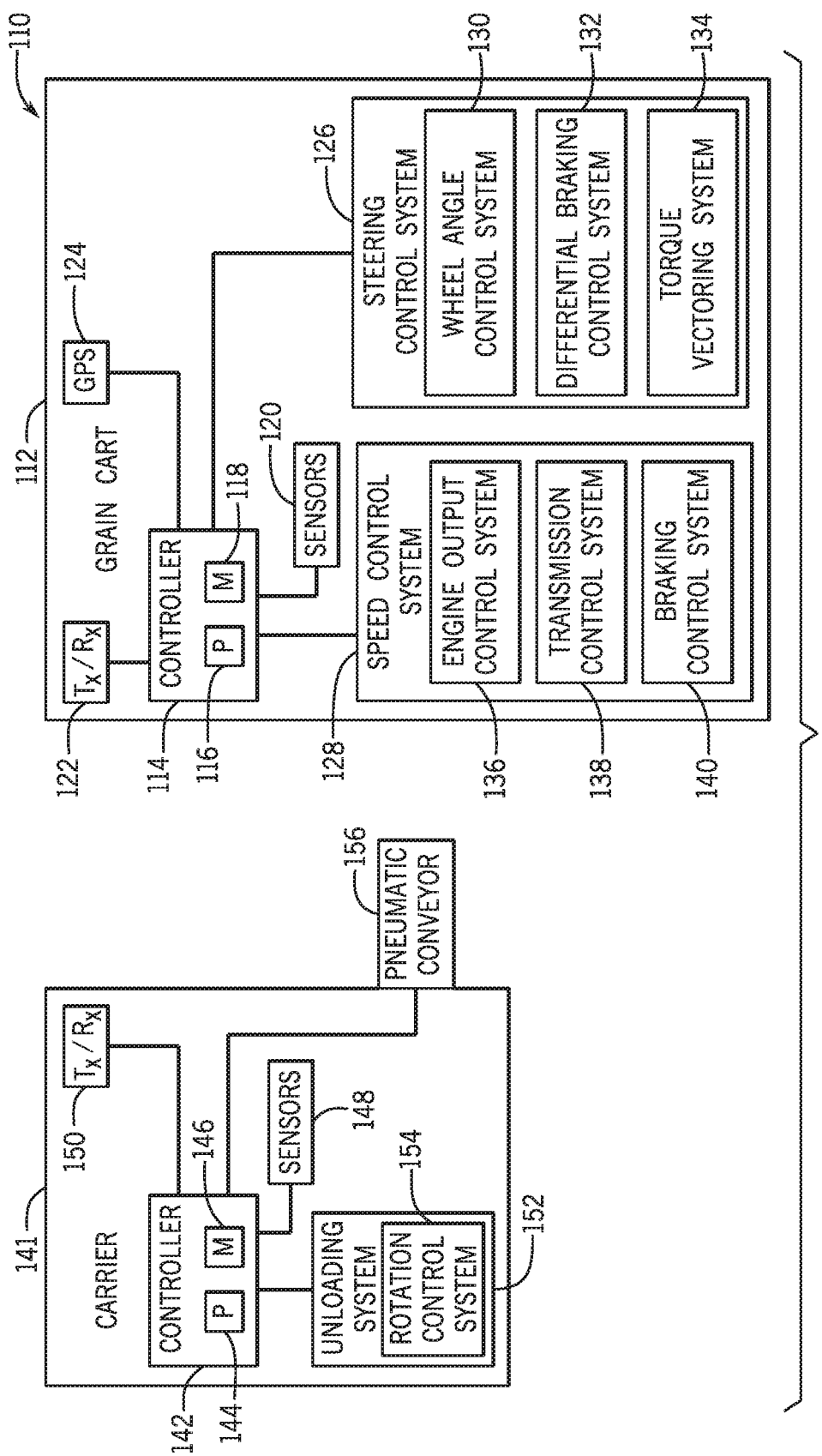
FIG. 5 is a block diagram of an embodiment of a control system that may control the agricultural cart of FIGS. 2-3 and the agricultural carrier system of FIG. 4.

FIG. 5 is a block diagram of an embodiment of a control system 110 configured to control the agricultural cart and the agricultural carrier system. The control system 110 includes an agricultural cart control system 112 that includes an agricultural cart controller 114 having a processor 116 and a memory device 118. The agricultural cart control system 112 also includes one or more sensors 120 (e.g., infrared sensors, ultrasonic sensors, magnetic sensors, etc.), a transceiver 122, and a spatial locating device 124 (e.g., global positioning system receiver, etc.) each communicatively coupled to the agricultural cart controller 114. Further, the agricultural cart controller 114 is configured to receive signal(s) from the one or more sensors 120, the transceiver 122, the spatial locating device 124, or a combination thereof, and to control one or more operations of the agricultural cart based at least in part on the received signal(s).

The agricultural cart controller 114 may generate and send signal(s) to a steering control system 126 to control a direction of travel of the agricultural cart and/or to a speed control system 128 to control a speed of the agricultural cart. In the illustrated embodiment, the steering control system 126 includes a wheel angle control system 130, a differential braking system 132, and a torque vectoring system 134. The wheel angle control system 130 may automatically rotate one or more wheels and/or tracks of the agricultural cart (e.g., via hydraulic actuators) to steer the agricultural cart along a desired route. By way of example, the wheel angle control system 130 may rotate front wheels/tracks, rear wheels/tracks, and/or intermediate wheels/tracks of the agricultural cart, either individually or in groups. The differential braking system 132 may independently vary the braking force on each lateral side of the agricultural cart to direct the agricultural cart along the desired route. Similarly, the torque vectoring system 134 may differentially apply torque from an engine to wheels and/or tracks on each lateral side of the agricultural cart, thereby directing the agricultural cart along a desired route. While the illustrated steering control system 126 includes the wheel angle control system 130, the differential braking system 132, and the torque vectoring system 134, it should be appreciated that alternative embodiments may include one or two of these systems, in any suitable combination. Further embodiments may include a steering control system 126 having other and/or additional systems to facilitate directing the agricultural cart along the desired route.

In the illustrated embodiment, the speed control system 128 includes an engine output control system 136, a transmission control system 138, and a braking control system 140. The engine output control system 136 is configured to vary the output of the engine to control the speed of the agricultural cart. For example, the engine output control system 136 may vary a throttle setting of the engine, a fuel/air mixture of the engine, a timing of the engine, other suitable engine parameters to control engine output, or a combination thereof. In addition, the transmission control system 138 may adjust gear selection within a transmission to control the speed of the agricultural cart. Furthermore, the braking control system 140 may adjust braking force, thereby controlling the speed of the agricultural cart. While the illustrated speed control system 128 includes the engine output control system 136, the transmission control system 138, and the braking control system 140, it should be appreciated that alternative embodiments may include one or two of these systems, in any suitable combination. Further embodiments may include a speed control system 128 having other and/or additional systems to facilitate adjusting the speed of the agricultural cart.

In the illustrated embodiment, the carrier control system 141 includes a carrier controller 142 having a processor 144 and a memory device 146. In addition, the carrier control system 141 includes one or more sensors 148, a transceiver 150, and an unloading system 152. The unloading system 152 includes a rotation control system 154 configured to rotate the rotatable base with respect to the carrier 50 to selectively unload the agricultural product from the agricultural cart into the storage bin. The rotation control system may control hydraulic or pneumatic fluid flow to an actuator (e.g., cylinder), or the rotation control system may provide electrical signal(s) to an electronic actuator (e.g., electromechanical actuator, etc.).

In the illustrated embodiment, the controllers 114 and 142 each include a processors, such as the microprocessor 116 and 144, and a memory, such as the memory devices 118 and 146, respectively. The controllers 114 and 142 may also include one or more storage devices and/or other suitable components. The processors 116 and 144 may be used to execute software, such as software for controlling the agricultural cart, the cart carrier, and so forth. Moreover, the processors 116 and 144 may include one or more "general-purpose" microprocessors, one or more special-purpose microprocessors, one or more application specific integrated circuits (ASICS), or some combination thereof. For example, each processor 116 and 144 may include one or more reduced instruction set (RISC) processors.

The memory devices 118 and 146 may include a volatile memory, such as random access memory (RAM), and/or a nonvolatile memory, such as read-only memory (ROM). The memory device 118 and 146 may store a variety of information and may be used for various purposes. For example, the memory devices 118 and 146 may store processor-executable instructions (e.g., firmware or software) for the processors 116 and 144 to execute, such as instructions for controlling the agricultural cart and/or the agricultural cart carrier. The storage device(s) (e.g., nonvolatile storage) may include ROM, flash memory, hard drive(s), or any other suitable optical, magnetic, or solid-state storage medium, or a combination thereof. The storage device(s) may store data (e.g., associated with control of the cart and/or cart carrier), instructions (e.g., software or firmware for receiving inputs from an operator and controlling operation of cart and/or cart carrier based on the received inputs), any other suitable data, or a combination thereof.

The spatial locating device 124 is communicatively coupled to the agricultural cart controller 114 and mounted to the agricultural cart. The spatial locating device 124 is configured to determine a position of the agricultural cart. The spatial locating device 124 may include any suitable system configured to determine the position of the agricultural cart, such as a global positioning system (GPS) receiver, for example. In certain embodiments, the spatial locating device 124 may be configured to determine the position of the agricultural cart relative to a fixed global coordinate system (e.g., via the GPS receiver) or a fixed local coordinate system. Further, in certain embodiments, the transceiver 122 may output signal(s) indicative of the position of the agricultural cart to the transceiver 150 of the carrier control system 141.

In the illustrated embodiment, the transceiver 122 of the agricultural cart control system may communicate with the transceiver 150 of the carrier control system 141 to coordinate unloading operations. For example, the controller 114 may receive signal(s) from the spatial locating device 124 indicative of a position of the agricultural cart. The controller 114 may determine the position of the cart based on the signal(s) and send a first signal indicative of the position of the agricultural cart to the carrier controller 142. The carrier controller 142 may determine if the position of the cart is within a threshold distance (e.g., less than 0.5 meters) of the docking position or in the docking position. In certain embodiments, the controller 114 may output a second signal indicative of instructions that the position of the cart is within a threshold distance of the docking position or in the docking position. The carrier controller 142 may send a third signal to the rotation control system 154 indicative of instructions to rotate the rotatable base from the docking position to the unloading position. For example, the rotation control system 142 may send a signal to a hydraulic, pneumatic, or electrically controlled actuator to instruct the actuator to rotate the rotatable base, thereby unloading the agricultural product from the agricultural cart into the storage bin. The carrier controller may be configured to receive a fourth signal from the cart controller 114 indicative of completion of unloading the agricultural product and to send a fifth signal to the unloading system 152 indicative of instructions to rotate the rotatable base of the carrier from the unloading position to the docking position to enable the agricultural cart to return to the agricultural field. In some embodiments, the fourth signal may be sent based on a period of time and/or a measured volume within the agricultural cart (e.g., when sensors of the cart determine the cart is empty).

When the rotatable base is in the docking position (e.g., as determined by sensors on the carrier) the controller 142 may then send a sixth signal via the transceiver 150 to the transceiver 122 of the agricultural cart indicative of the rotatable base returning to the docking position, thereby completing the unloading process and enabling the agricultural cart to return to the agricultural field. For example, the cart controller 114 may be configured to receive the sixth signal and to send a seventh signal to the steering control system 126, the speed control system 128, or a combination thereof, indicative of instructions to move the agricultural cart from the carrier to the agricultural field.

In certain embodiments, the carrier controller may be configured to send the third signal to a pneumatic control system to instruct a pneumatic conveyer 156 to unload the agricultural product from the agricultural cart into the storage bin. Further, the carrier controller 142 may be configured to send an eighth signal to the pneumatic control system to instruct the pneumatic conveyer to stop operation of the pneumatic conveyer after a period of time.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural system, comprising:
   a carrier configured to transport an agricultural cart to a position proximate to or within an agricultural field, wherein the carrier comprises a rotatable base and is configured to receive the agricultural cart on the rotatable base in a docking position, and to move the agricultural cart from the docking position to an unloading position to unload agricultural product from within the agricultural cart to a storage bin via rotation of the rotatable base;
   wherein the carrier comprises a lower level and an upper level, the upper level is above the lower level with respect to an agricultural field, and each level is configured to transport the agricultural cart.

2. The agricultural system of claim 1, wherein the carrier comprises a first ramp configured to enable the agricultural cart to move from the agricultural field to the upper level, and a second ramp, different from the first ramp, configured to enable the agricultural cart to move from the upper level to the agricultural field.

3. The agricultural system of claim 1, wherein the rotatable base is disposed on the upper level of the carrier.

4. The agricultural system of claim 1, wherein the carrier is configured to be transformed from a transportation mode having a first ramp and a second ramp in a raised position forming respective portions of the upper level of the carrier into a harvesting mode having the first ramp and the second ramp in a lowered position in which the first ramp is configured to enable the agricultural cart to move from the agricultural field to the upper level and the second ramp is configured to enable the agricultural cart to move from the upper level to the agricultural field.

5. The agricultural system of claim 4, wherein the carrier comprises one or more support legs configured to deploy to support the carrier while the carrier is in the harvesting mode.

6. The agricultural system of claim 1, wherein the carrier comprises a hitch configured to form an articulation point between the towing vehicle and the carrier.

7. An agricultural system, comprising:
   a carrier configured to transport an agricultural cart to an agricultural field or proximate to the agricultural field, wherein the carrier comprises a lower level, an upper level, a first longitudinal side, and a second longitudinal side, opposite the first longitudinal side, a first ramp is positioned on the first longitudinal side and configured to enable the agricultural cart to move from the agricultural field to the upper level, and a second ramp, different from the first ramp, is positioned on the second longitudinal side and configured to enable the agricultural cart to move from the upper level to the agricultural field.

8. The agricultural system of claim 7, wherein the carrier is configured to transform between a transportation mode in which the first ramp and the second ramp are in respective raised positions on the upper level of the carrier to transport the agricultural cart to the agricultural field and a harvesting mode in which the first ramp and the second ramp are in respective lowered positions, wherein the first ramp is configured to enable the agricultural cart to move from the agricultural field to the upper level and the second ramp is configured to enable the agricultural cart to move from the upper level to the agricultural field.

9. The agricultural system of claim 8, wherein the carrier comprises one or more support legs configured to deploy to support the carrier while the carrier is in the harvesting mode.

10. The agricultural system of claim 8, wherein the carrier is configured to transport a first set of agricultural carts on the upper level and a second set of agricultural carts on the lower level while in a transportation mode.

11. The agricultural system of claim 7, wherein the carrier is configured to rotate a rotatable base on the upper level of the carrier to move the agricultural cart from a docking position, in which the rotatable base is configured to receive the agricultural cart, to an unloading position, in which the rotatable base positions the agricultural cart to unload agricultural product into the storage bin, via rotation of the rotatable base.

12. An agricultural system, comprising:
   a carrier configured to transport an agricultural cart to a position proximate to or within an agricultural field; and
   a carrier controller comprising a processor and a memory and configured to control operations of the carrier, wherein the carrier controller is configured to:
      receive at least one of a first signal indicative of a position of the agricultural cart and a second signal indicative of the agricultural cart in a docking position on the carrier; and
      send a third signal indicative of instructions to unload agricultural product from the agricultural cart into a storage bin while the position of the agricultural cart is within a threshold range of the docking position, the agricultural cart is in the docking position, or a combination thereof.

13. The agricultural system of claim 12, wherein the carrier controller is configured to send the third signal to an unloading system to instruct the unloading system to rotate a rotatable base of the carrier to move the agricultural cart from the docking position, in which the rotatable base is configured to receive the agricultural cart, to an unloading position, in which the rotatable base positions the agricultural cart to unload agricultural product into a storage bin, via rotation of the rotatable base.

14. The agricultural system of claim 13, wherein the carrier controller is configured to receive a fourth signal from a cart controller of the agricultural cart indicative of completion of unloading the agricultural product and to send a fifth signal to the unloading system indicative of instructions to rotate the rotatable base of the carrier from the unloading position to the docking position to enable the agricultural cart to return to the agricultural field.

15. The agricultural system of claim 14, wherein the carrier controller is configured to send a sixth signal to the cart controller indicative of the rotatable base returning to the docking position to instruct the agricultural cart to move from the carrier to the agricultural field.

16. The agricultural system of claim 15, comprising the cart controller, wherein the cart controller is configured to receive the sixth signal and to send a seventh signal to a steering control system, a speed control system, or a combination thereof, indicative of instructions to move the agricultural cart from the carrier to the agricultural field.

17. The agricultural system of claim 12, wherein the carrier controller is configured to send the third signal to a pneumatic control system to instruct a pneumatic conveyer to unload the agricultural product from the agricultural cart into the storage bin.

18. The agricultural system of claim 17, wherein the carrier controller is configured to send an eighth signal to the pneumatic control system to instruct the pneumatic conveyer to stop operation of the pneumatic conveyer after a period of time.

19. The agricultural system of claim 12, wherein the carrier controller is configured to receive the first signal indicative of the position of the agricultural cart and to compare the position of the agricultural cart to the threshold range of the docking position.

* * * * *